United States Patent [19]
Chang et al.

[11] Patent Number: 5,214,731
[45] Date of Patent: May 25, 1993

[54] OPTICAL FIBER CONNECTOR ASSEMBLY WITH SIMPLE FERRULE ASSEMBLY MECHANISM FOR EASY ASSEMBLING

[75] Inventors: Peter C. Chang, Mountain View, Calif.; Hsin I. Lin, Taipei, Taiwan; Fred Chien, Chung-Ho, Taiwan; I-Li Chien, Taipei, Taiwan

[73] Assignee: Foxconn International, Inc., Sunnyvale, Calif.

[21] Appl. No.: 811,569

[22] Filed: Dec. 20, 1991

[51] Int. Cl.⁵ .............................................. G02B 6/36
[52] U.S. Cl. ...................................... 385/69; 385/65; 385/72
[58] Field of Search ...................... 385/69, 65, 66, 71, 385/72

[56] References Cited

U.S. PATENT DOCUMENTS

| | | | |
|---|---|---|---|
| 4,445,750 | 5/1984 | Grois et al. | 385/69 |
| 4,449,784 | 5/1984 | Basov et al. | 385/69 X |
| 4,611,887 | 9/1986 | Glover et al. | 385/71 |

Primary Examiner—John D. Lee
Assistant Examiner—Phan Thi Heartney

[57] ABSTRACT

The present invention discloses an optical fiber connector assembly for use in communication systems. The optical fiber connector assembly includes an insulating housing having complementary upper cover and bottom base members and at least one ferrule with the housing disposed longitudinally and parallel to the longitudinal axis at the free end of the housing. A multifaceted key mechanism within the housing provides a marking feature to prevent improper connection of mating connectors. At the rear end of the bottom base and its corresponding upper cover there is provided a hollow retention bolt which is preassemblable and adapted to retain the optical fiber cable in position and to hold the two half-shells together. A dust-reject cover is provided having cooperating grooved recesses in opposite end walls sized to fit over and be retained on the connector cable when the connector is connected to another optical device and the dust cover must be removed from the housing.

9 Claims, 4 Drawing Sheets

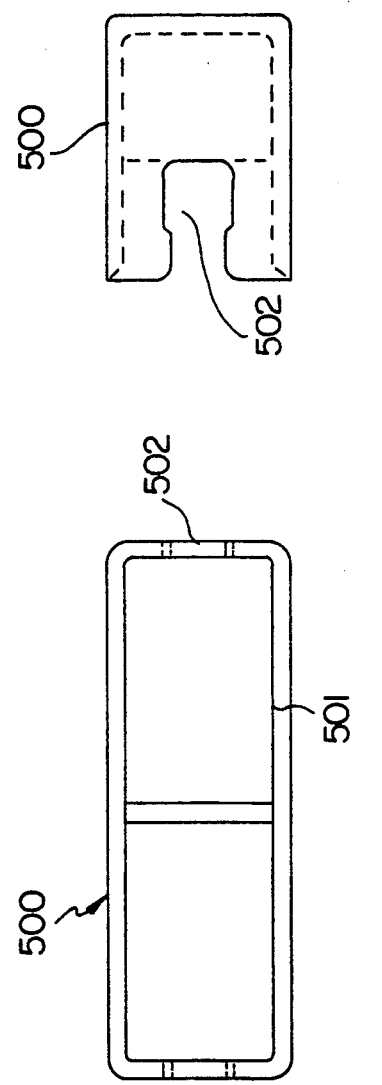

OPTICAL FIBER CONNECTOR ASSEMBLY WITH SIMPLE FERRULE ASSEMBLY MECHANISM FOR EASY ASSEMBLING

BACKGROUND OF THE INVENTION

1. Field of the Invention

The present invention relates to an optical fiber connector assembly, and particularly to an optical fiber connector with simplified assembly mechanism having greater structural strength and an improved mode marking feature.

2. Description of the Prior Art

The prior art as known is exemplified by FIG. 1. It is not known whether any patents exist that describe the structure of FIG. 1. Accordingly, a detailed description of FIG. 1 will aid an understanding of the invention forming the subject matter hereof. In FIG. 1, there is shown a plan view of a prior art optical fiber connector, portions being displaced or "exploded" for greater clarity. The connector includes housing shells 1. Extending from the rear end of the shell (left end as viewed in FIG. 1), is a cable receiving passageway 2 which is threaded externally and is adapted to be engaged by nut 4. Also included as a part of the housing is a groove 5 which is disposed at a proper position in relation to the passageway to receive an interlocking flange.

A bushing 6 adapted to hold the fiber cable 9 has a flange 8. A passageway 7 is formed through the bushing and the flange through which the cable 9 extends. The strength member yarn 10, constituting a synthetic resinous material sold under the trademark KEVLAR, is adapted to be disposed between the external surface 11 of the bushing's body at its front end and the inner surface of a metal socket or sleeve 12 which is fitted over the bushing body in an interference fit to hold the strength member yarn in a fixed position. There is a projecting rib 13 extending from the external surface of the bushing body which is used to hold the cable 9 in a fixed position when the socket 12 is fitted over the bushing, pressing the projecting rib downwardly into the passageway 7 and into clamping relation with the cable 9. The shells 1 are held together when the bushing 6 is loaded into receiving passageway 2, and nut 4 is then turned onto the external threads 3.

Because the fiber cable is of indefinite length, the fiber cable must be threaded through the nut as a first step of the assembly. Unfortunately, the assembly line worker is prone to leave the nut off, and does not discover the omission until the rest of the assembly has been completed. When this occurs, all the assembled components must be disassembled to start the whole assembly procedure over again by first threading the cable through the nut. Accordingly, one of the objects of the present invention is to provide an optical fiber connector structure that provides means for eliminating this potential problem.

To implement the metal socket 12 requires a special tool, thus increasing the cost of the connector in time and money. Accordingly, another object of the invention is the provision of a connector that is economical to fabricate and readily assembled without special tools.

Furthermore, the locking structure of the prior art housing is based on a single screw locking mechanism that is not secure enough to retain the shells tightly clamped after an interval of utilization. Accordingly, a still further object of the invention is to provide an optical connector structure that will remain tightly clamped for its entire life.

It should also be noted that the mode marking system in the prior art connector employs a cavity 14 disposed on the housing shell 1 to receive a single-faceted key element to mark one of the many possible function modes. As a consequence, several other cavities disposed on the dust-reject cover are required by the prior art to receive the unused mode marking key elements. In practice, the dust-reject cover is attached to the fiber cable by a cord. As a result, many of the mode marking key elements can be lost very easily. It is therefore a still further object of the invention herein to obviate this disadvantage.

The ferrule 16 of the prior art includes a flange 17 disposed at the front end thereof, a coil spring 19 surrounding the body portion 18, followed by a stop collar 20 and a split spring retaining ring 21 engaging a groove at the rear end of the ferrule to hold the coil spring between the flange and stop collar. The flange and stop collar of the ferrule are then received in a nest 22 of the housing shell 1 to form an elasticity buffer. However, the structure and the size of the prior art ferrule make the assembly inconvenient and costly. Accordingly, yet another object of the invention is to simplify this ferrule structure.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the optical fiber connector assembly of the invention comprises an insulating housing formed from two complementary upper cover and lower base members suitably locked together to form the hollow housing. Within the housing is formed at least one ferrule-receiving trough adapted to receive a ferrule for securing an optical fiber cable to the housing. The ferrule is pre-assemblable and when placed in the housing nests in an appropriate nacelle or receiving cavity within the housing. Also formed in the housing is a passageway for receiving a hollow retention bolt through which an optical fiber cable enters the housing. Surface portions of the retention bolt on opposite sides of the housing wall are threaded to receive thrust nuts adapted when threaded onto the retention bolt, to compress spring washers to lock the retention bolt to the housing. Means are provided for loosely retaining one of the thrust nuts on the retention bolt pending final assembly, whereupon the thrust nut is tightened against the associated end of the housing. Means are provided in the form of a resiliently depressible rib or tang that is depressed when the second thrust nut is threaded onto the retention bolt to bind an enclosed optical fiber cable to the retention bolt. Means in the form of a selectively detachable dust cover are provided to protect the interior of the housing against the intrusion of dust. A multi-faceted mode-marking key mechanism is also provided nested in an appropriate recess formed within the housing between the upper cover member and the lower base member.

BRIEF DESCRIPTION OF THE DRAWINGS

Features of the present invention will be more readily understood from the following detailed description of specific embodiments thereof when read in conjunction with the accompanying drawings, in which:

FIG. 4 is a front view of the dust-reject cover of the present invention.

FIG. 5 is an end view of the dust-reject cover of the present invention.

DESCRIPTION OF THE PREFERRED EMBODIMENT

Figure 1:
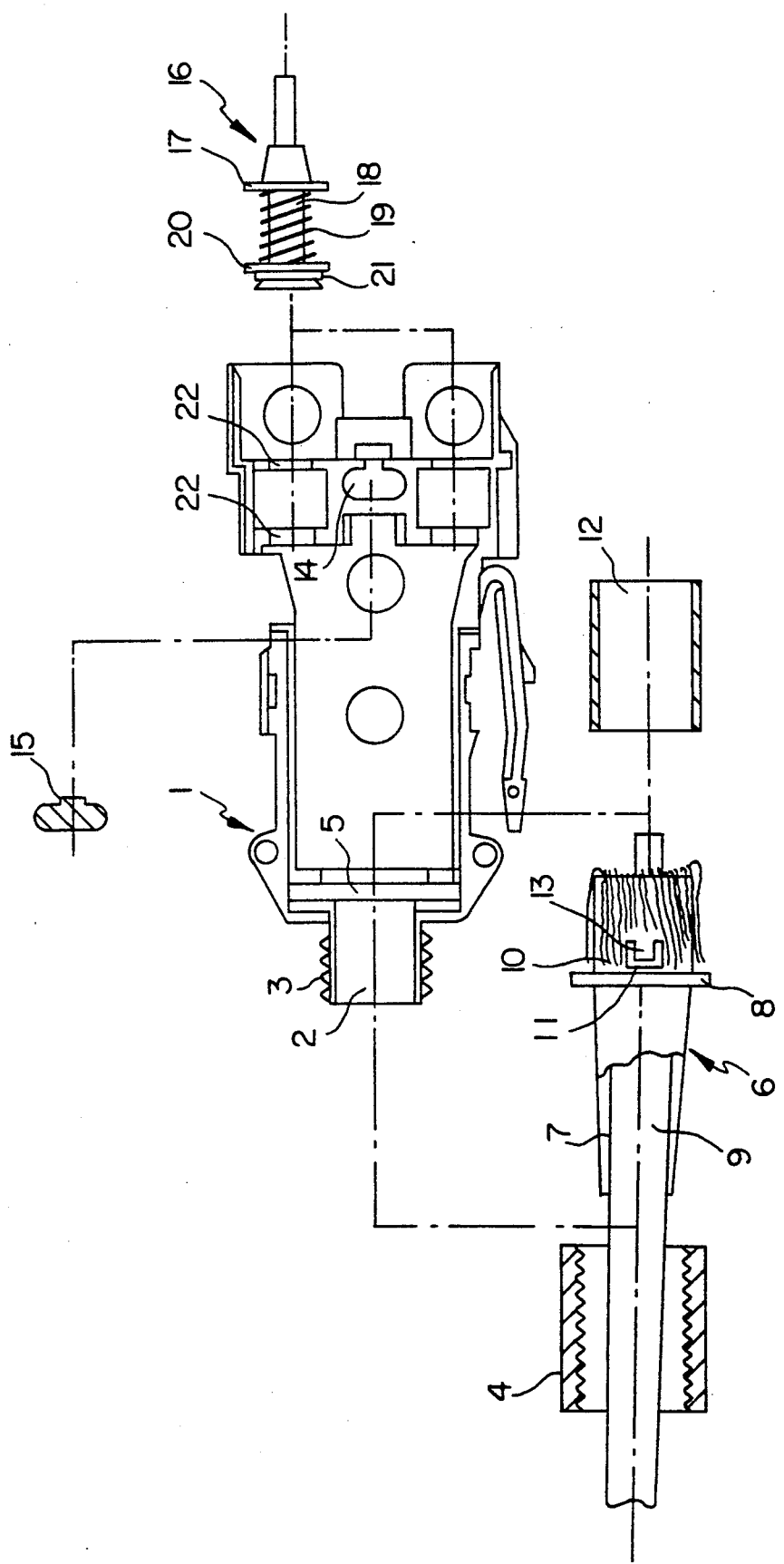
FIG. 1 is a plan view of a prior art optical fiber connector.
Figure 2:
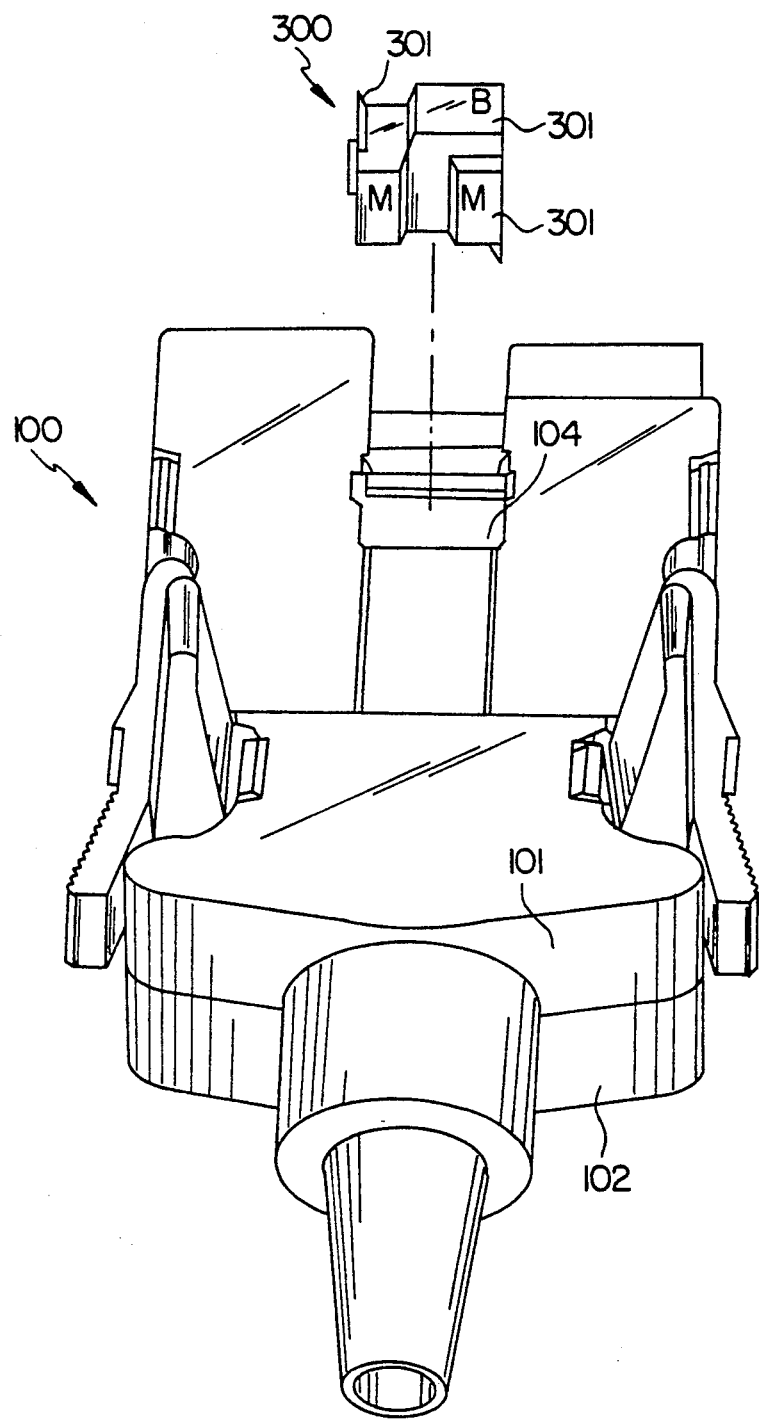
FIG. 2 is an overall perspective view of the optical fiber connector forming the subject matter of this invention, shown in assembled form apart from an optical cable.
Figure 3:
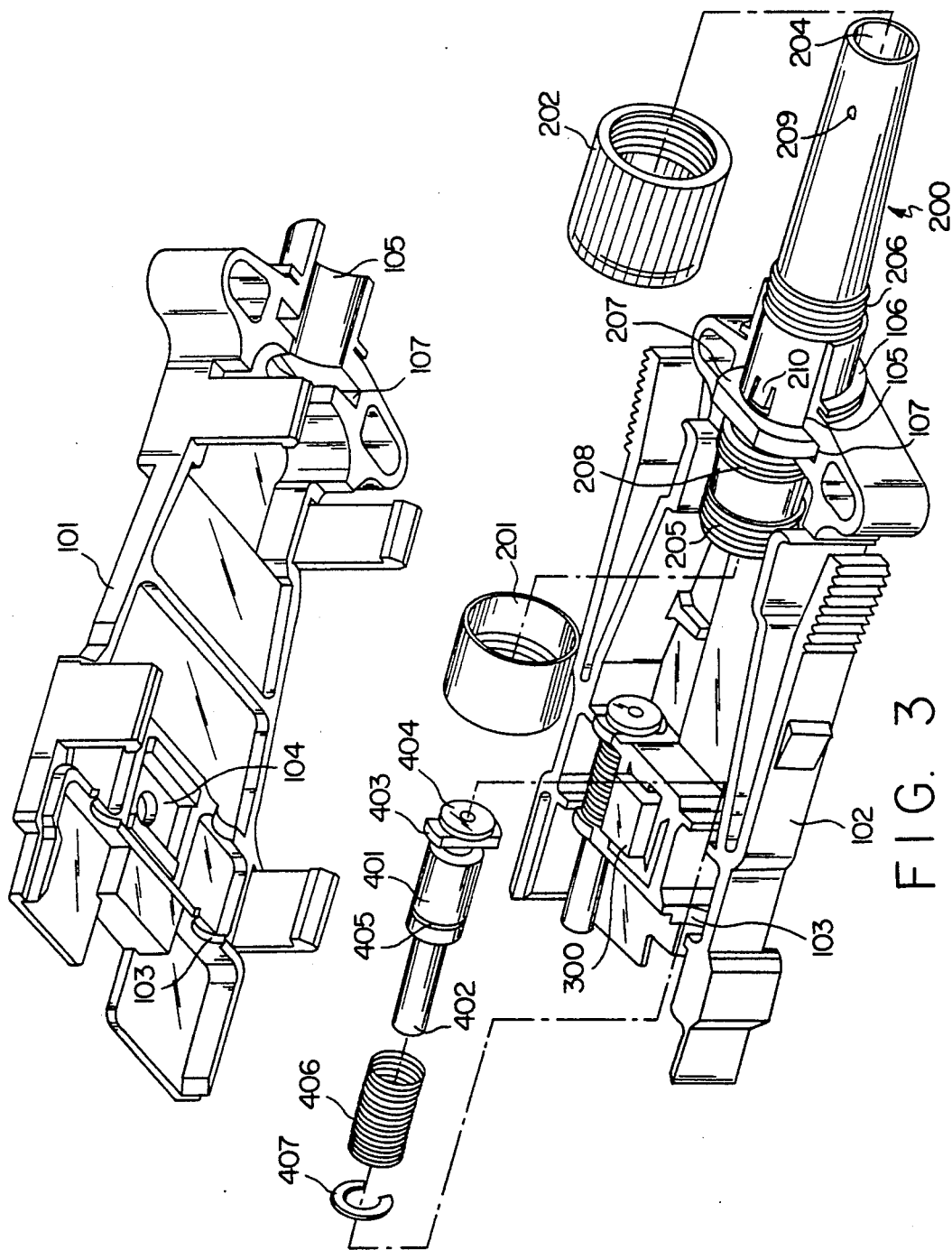
FIG. 3 is an exploded perspective view of the optical fiber connector of the present invention.

In terms of greater detail, and referring to FIG. 3, there is shown the detailed components of the fiber connector assembly of the present invention. The insulating housing is designated generally by the numeral 100 as indicated in FIG. 2. The insulating housing is formed by complementary upper cover 101 and lower or bottom base 102 with at least one and preferably two ferrule-receiving troughs 103 disposed parallel to the longitudinal axis at the free end of the housing. At least one ferrule 400 is provided to secure an optical fiber, and is spring-loaded at the aforementioned ferrule receiving trough 103 as illustrated in FIG. 2.

A mode-marking key-receiving cavity 104 is formed in the upper cover 101 and cooperates with a mode-marking key-receiving cavity formed in the bottom base 102 of the aforementioned insulating housing as shown. A multi-faceted key mechanism 300 provides mode-marking capability by inserting the key mechanism into the aforementioned receiving cavity 104 as shown with the mode-designating side facing up.

There is also formed in the housing a passageway 105 formed concentrically along the longitudinal axis of the housing at the rear end of the bottom base 102 and its corresponding upper cover 101, with an engaging groove or lock 107 disposed at a proper place of the passageway 105 to receive the spring washer 106 which in turn receives a set of optical fiber cable retention means 200.

The retention means includes one tubular retention bolt 200, a first thrust nut 201 and a second nut 202. As shown, the tubular retention bolt 200 is bored to define a passageway 204 and is threaded externally to provide a first threaded surface 205 and a second threaded surface 206 spaced axially from the first threaded surface. Interposed at a proper position between the two threaded surfaces of the hollow retention bolt is a radially extending circumferential engaging or lock flange 207 and a spring washer 208. The engaging or lock flange 207 of the hollow retention bolt 200 is inserted into the engaging or lock groove 107 of the aforementioned passageway 105 of the insulating housing 100.

An optical fiber cable (not shown) is adapted to extend through the passageway 204 of the retention bolt 200 and the strength member yarn of the cable, when inserted, will be disposed around the external surface of the retention bolt 200 within the housing, being draped over the threaded end of the retention bolt. The first thrust nut 201 is turned onto the first end portion of the retention bolt 200 that has the first threaded surface 205 thereon, superimposed over the KEVLAR strengthening yarn, and pushes the spring washer 208 tightly against the engaging flange 207.

The second nut 202 is preferably pre-assembled onto the retention bolt even prior to insertion of the optical fiber cable through passageway 204, and is later turned onto the second threaded surface of the bolt to hold the housing cover and base together. The pre-assembled second nut is retained loosely on the retention bolt and secured against loss by a barb 209 projecting at a proper position near the forward or second end of the retention bolt as shown. The second nut may be pushed past the barb, but the barb prevents the second nut from inadvertently slipping off the retention bolt in the reverse direction. After mating of the upper and lower housing members, the second nut is turned onto the second threaded surface of the retention bolt 200 to push the spring washer 106 tightly against the housing wall and to resiliently depress the normally projecting rib or tang 210 to hold the fiber cable and retention bolt in operative position. In addition to retaining the fiber cable attached to the housing, the second nut 202 functions also to hold the upper cover and bottom base of the housing together.

Key element 300, shown in perspective in FIG. 2 apart from the housing, comprises a generally parallelepiped-shape key element having multi-faceted mode-marking positions. Each marking position is composed of a different shape of geometrical block 301 to allow facility of insertion of the key element into the receiving cavity 104 of the insulating housing 100 while providing the feature of ready substitution of various interconnection modes by the simple procedure of taking out the key element and turning it around to the desired position and reinserting it to mark the correct interconnection mode. This facility eliminates the disadvantage of the prior art that requires multiple key elements that may be lost.

Ferrule assembly 400, illustrated in FIG. 3, includes a first body portion 401 and a second integral body portion 402. The first body portion 401 includes an engaging portion 403 and a stop portion 404 at the front end of the first body portion and has a circumferential groove 405 adjacent the opposite end. A spring device 406 is disposed about the first body portion, and a C-shaped retaining ring 407 is inserted into the aforementioned circumferential groove to cooperate with the engaging portion 403 to position the spring device 406 therebetween and to implement the ferrule assembly as an effective device to accommodate tolerance variations in the housing and in a coupling (not shown) which interconnects the connectors. The ferrule assembly can be easily loaded into the receiving trough 103 of the insulating housing 100 to provide a near perfect buffer feature.

The dust-reject cover 500 (FIGS. 4 and 5) comprises a hollow rectangular box-shaped body with an opening 501 disposed on one side of the hollow body conforming to the front end of the connector insulating housing 100 to properly fit over and protect the interior of the insulating housing. A pair of slots 502 disposed on opposite ends of the body adjacent the opening 501 of the hollow body are provided to allow the dust-reject cover to be detachably attached to the fiber cable when the connector is connected to another device and the cover is removed from the connector housing.

In accordance with the present invention described above, the structureal design and retention strength of the cooperating components have been significantly improved over the prior art. Furthermore, the present structure renders the optical fiber connector substantially pre-assemblable to prevent certain assembly procedures being omitted.

Having thus described the invention, what is believed to be novel and sought to be protected by letters patent of the United States is as follows.

We claim:

1. An optical fiber connector assembly, comprising:
   a) an elongated insulating housing having a longitudinal axis and complementary upper cover and bottom base members formed with at least one ferrule-receiving trough disposed longitudinally of the housing adjacent a first end thereof;
   b) a ferrule assembly cradled in said ferrule-receiving trough and adapted to have secured thereto an optical fiber cable;
   c) a multi-faceted mode-marking key mechanism mounted within the housing;
   d) a passageway in said housing formed concentrically about the longitudinal axis of the housing at the end of the bottom base member and its corresponding upper cover member opposite said first end thereof; and
   e) retention means for retaining an optical fiber cable attached to the housing and including a retention bolt having first and second sets of external threads thereon, and first and second thrust nuts adapted to engage said first and second sets of external threads, respectively, to clamp said retention bolt to said housing, said retention bolt being hollow to define a passageway therethrough to receive the optical fiber cable adapted to extend into said housing, thereby said first and second nuts holding the optical fiber cable and the retention bolt in operative position;
   wherein said ferrule assembly includes first and second axially aligned integral body portions, said first portion having an engaging portion and a stop portion at a front end of the first body portion and having a circumferential groove adjacent an opposite end, a spring device disposed about the first body portion, and a C-shaped retaining ring inserted into said groove whereby said spring device is positioned between the C-shaped retaining ring and the engaging portion.

2. The optical fiber connector assembly according to claim 1, wherein said passageway in said housing concentrically formed about said longitudinal axis is provided with a radially extending circumferential groove extending into said complementary upper cover and said bottom base members in the end wall of said housing opposite said first end thereof, and said hollow retention bolt is provided intermediate said first and second sets of external threads with a radially extending circumferential flange adapted to be snugly received in said circumferential groove when said upper cover and bottom base members are superimposed over said retention bolt.

3. The optical fiber connector assembly according to claim 1, wherein said hollow retention bolt is provided with annular spring washers associated with said first and second thrust nuts whereby when said thrust nuts are tightened to clamp said housing wall therebetween said annular spring washers resiliently impinge on the housing wall.

4. The optical fiber connector assembly according to claim 1, wherein means are provided on said retention bolt operative to retain said second thrust nut loosely on said retention bolt prior to threaded engagement of said second thrust nut with said second set of external threads, whereby permitting pre-assembly of said retention bolt and said second thrust nut prior to insertion of an optical fiber cable through said hollow retention bolt.

5. The optical fiber connector assembly according to claim 1, wherein means are provided on said retention bolt resiliently depressible into the interior of said retention bolt when said second thrust nut is applied to said second set of external threads, whereby said means clamp against an optical fiber cable extending through said retention bolt to retain the optical fiber cable clamped to said retention bolt.

6. The optical fiber connector assembly according to claim 1, wherein said multi-faceted mode-marking key mechanism comprises a generally parallelepiped-shape member having multifaceted mode marking surfaces enabling said key mechanism to be withdrawn from said housing and re-inserted thereinto to provide a marking feature signifying a different interconnection mode.

7. The optical fiber connector assembly according to claim 1, wherein a dust-reject cover is detachably engageable on one end of said housing to preclude the entry of dust thereinto, and means are provided on said dust-reject cover for suspending said cover on an optical fiber cable when it is removed from said housing.

8. An easy assembled optical fiber connector assembly comprising:
   an elongated insulating housing having a longitudinal axis and complementary upper cover and bottom base members formed with at least one ferrule-receiving trough disposed longitudinally of the housing adjacent a first end thereof;
   a ferrule cradled in said ferrule-receiving trough and adapted to have secured thereto an optical fiber cable;
   a passageway in said housing formed concentrically about the longitudinal axis of the housing at an end of the bottom base member and its corresponding upper cover member opposite said first end thereof;
   retention means for retaining an optical fiber cable attached to housing, said retention means including a retention bolt having at least a set of external threads thereon, at least a thrust nut adapted to engage said set of external threads to clamp said retention bolt to said housing, said retention bolt being hollow to define a passageway therethrough to receive the optical fiber cable adapted to extend into said housing; and
   a barb positioned on said retention bolt operative to retain said thrust nut loosely on said retention means prior to threaded engagement of said thrust nut with said set of external threads, thereby permitting pre-assembly of said retention bolt and said thrust nut prior to insertion of the optical fiber cable through said hollow retention bolt.

9. The easy assembled optical fiber connector assembly according to claim 8, wherein said hollow retention is provided with an annular spring washer associated with said thrust nut whereby when said thrust nut is tightened to clamp a housing wall thereabout, said annular spring washer resiliently impinges on said housing wall.

* * * * *